Aug. 20, 1968        L. KATZMAN ET AL        3,398,264
PIZZA WARMER
Filed Aug. 23, 1965                    2 Sheets-Sheet 1
FIG. 1
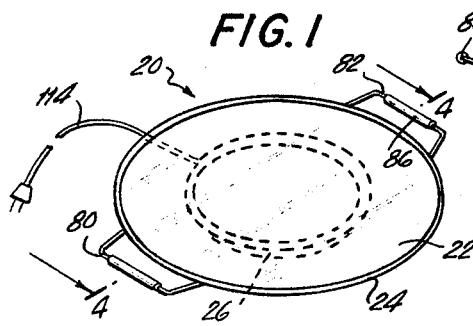
FIG. 2
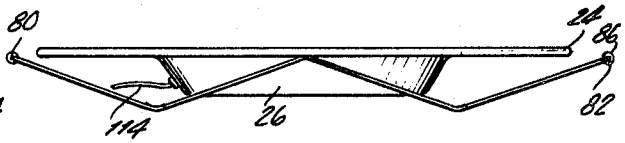
FIG. 12
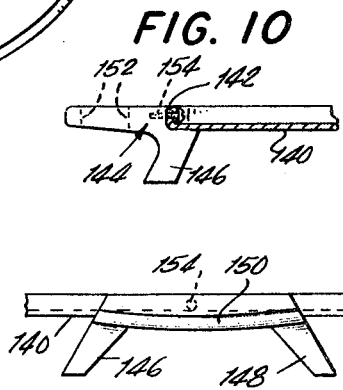
FIG. 10
FIG. 11
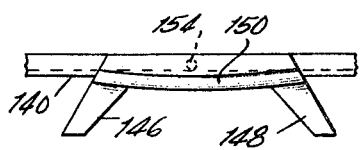
FIG. 3
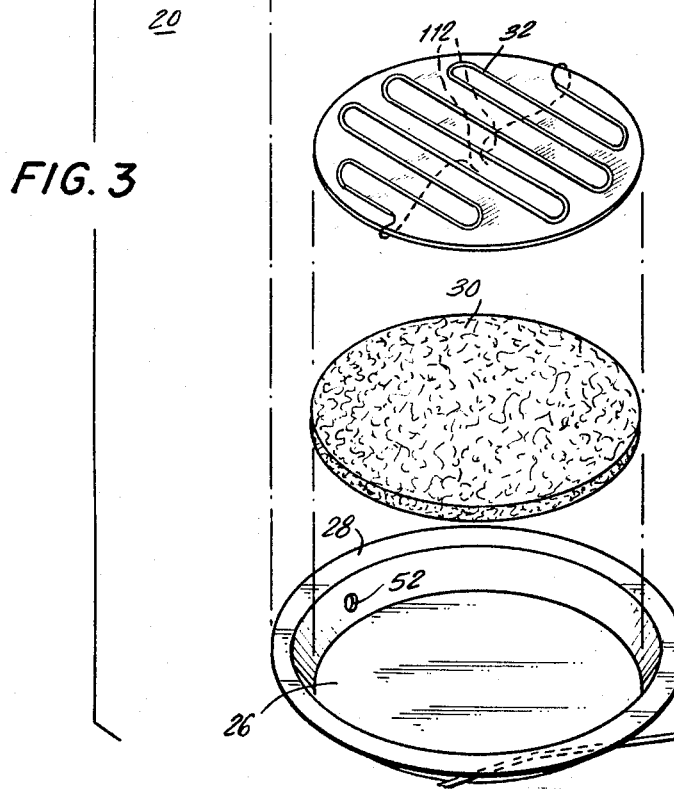
INVENTORS
LAWRENCE KATZMAN
ROBERT DUBLIRER
ATTORNEYS

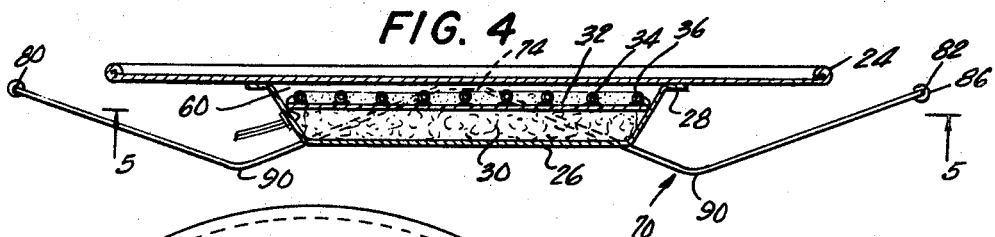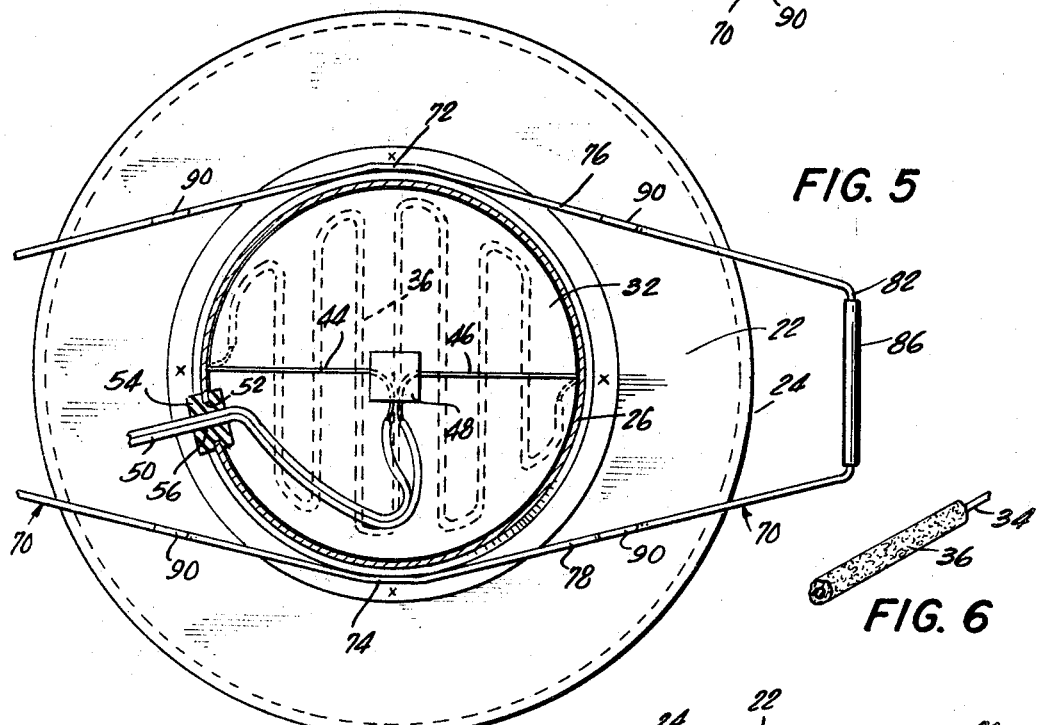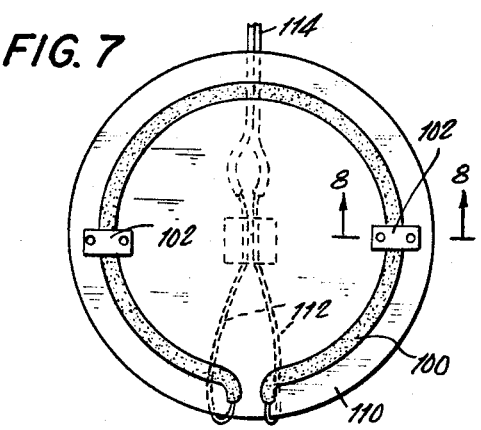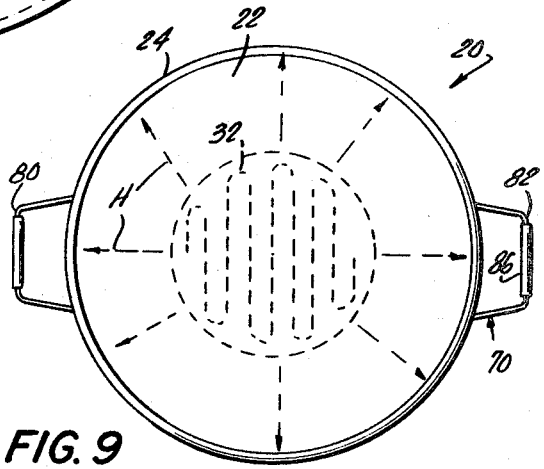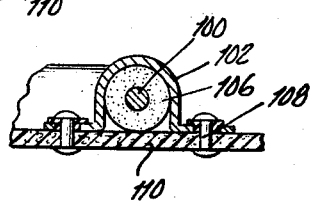

United States Patent Office 3,398,264
Patented Aug. 20, 1968

3,398,264
PIZZA WARMER
Lawrence Katzman and Robert Dublirer, New York, N.Y., assignors to Kaz Heating Products, Inc., New York, N.Y., a corporation of New York
Filed Aug. 23, 1965, Ser. No. 481,720
3 Claims. (Cl. 219—454)

ABSTRACT OF THE DISCLOSURE

A pizza warming tray comprising a metallic disc having high heat conductivity and being relatively larger in diameter having a receptacle disposed beneath the disc and secured thereto with electric heating coil means disposed in the receptacle, said heating coil means being of less than one-half the diameter of said metallic disc.

---

This invention relates to a food warmer and more particularly to an electrical appliance for maintaining pizza and other foodstuffs warm.

In the past various types of hotplates, food warmers, plate warmers and the like have been devised, none of which were adapted to supply heat to foodstuffs such as pizza, which occupy a comparatively large area. This is because these types of heating plates would normally require expensive installation of heating coils and the like. However, in accordance with the concepts of the present invention, it has been determined that a relatively small diameter receptacle having heating coils therein disposed beneath a large diameter disc of metal of high heat conductivity, such as stainless steel or aluminum, supplies sufficient heat to the central locations of the disc so as to allow the heat conductivity characteristics of the disc or tray to carry heat to the outermost edges thereof, so as to heat in a comparatively even manner all portions of a pizza or like foodstuff.

The concept of this invention features a pizza warmer comprising three main portions. One of these is a relatively large diameter disc of metal having high heat conductivity characteristics. The second important element of the invention includes a receptacle disposed beneath the disc containing an insulating pad, a vulcanized fiber board overlying the pad and having electric heating coils disposed thereon as well as an asbestos paper sheet overlying the heating coils. This receptacle is secured centrally at the disc and is of less than half the diameter of the disc. The third important portion of the invention is a combination handle and leg means which is secured to the disc.

Still further objects and features of this invention reside in the provision of a pizza warmer that is strong, sturdy and durable, easily cleaned, highly attractive in appearance, comparatively light in weight, and relatively inexpensive to manufacture, thereby permitting wide use and distribution.

These, together with the various ancillary objects and features of the invention, which will become apparent as the following description proceeds, are attained by this pizza warmer, preferred embodiments of which have been illustrated in the accompanying drawings, by way of example only, wherein:

FIG. 1 is a perspective view of an embodiment of the pizza warmer constructed in accordance with the concepts of the present invention;

FIG. 2 is an enlarged side elevational view of the pizza warmer;

FIG. 3 is an exploded perspective view thereof;

FIG. 4 is an enlarged vertical sectional view taken along the plane of line 4—4 in FIG. 1;

FIG. 5 is a horizontal sectional view taken along the plane of line 5—5 in FIG. 4;

FIG. 6 is an enlarged partial perspective view of a portion of one of the heating coil elements;

FIG. 7 is a plan view of a modified heating coil arrangement;

FIG. 8 is an enlarged vertical sectional view taken along the plane of line 8—8 in FIG. 7;

FIG. 9 is a top plan view of the invention showing the direction of heat conductivity;

FIG. 10, sheet 1, is a sectional detail view of a modified form of combination handle and leg means and attachment means;

FIG. 11 is a partial end elevational view of the embodiment shown in FIG. 10; and, FIG. 12 is a sectional detail view of a further modification of the invention.

With continuing reference to the accompanying drawings, wherein like reference numerals designate similar parts throughout the various views, reference numeral 20 generally designates a pizza warmer constructed in accordance with the concepts of the present invention. This pizza warmer 20 includes a disc-shaped tray 22 formed of aluminum or stainless steel and which has an upturned peripheral edge 24. Secured to the tray or disc 22 is a receptacle 26 which may be either pie pan-shaped as shown or which may be of a cylindrical configuration. The container 20 is preferably made of metal and is welded, bolted, riveted, or otherwise secured to the tray 22 in a convenient manner. The receptacle 26, as can be best seen in FIG. 4, is provided with a peripheral flange 28 for facilitating attachment to the undersurface of the disc 22 and contains a insulating pad 30 of jute. This insulating pad is relatively thick and occupies approximately one-half the depth of the receptacle 26. Disposed on the jute insulating pad 30 is a vulcanized fiber board 32 having Nichrome coils 34 bonded thereto. The Nichrome coils 34 may be arranged in a sinusoidal pattern, as can be best seen in FIG. 5, and have wrapped thereabout asbestos fibers 36, as shown in FIG. 6. Connected to the ends of the heating coil 32 are reeds 44 and 46, which are connected at an insulating block or any other like manner as at 48 to a twin conductor electric cord 50.

The receptacle 26 is provided with an opening 52 therein in which a strain relief bushing 54 is disposed. This bushing is formed of an electrically insulative and relatively good heat insulative material, and has a bore 56 through which the electric cord 50 passes. The electric cord is adapted to be connected to a conventional electric outlet for connecting the device to a source of electric current and a switch may be provided, if desired, for controlling electric current flow through the heating coil.

Disposed on and overlying the heating coil is a sheet 60 of asbestos paper or like insulator which is preferably relatively thin, and while it is protective, it does not prevent or reduce to any extent ultimate transmittal of a suitable amount of heat to the disc 22. The disc 22 is of a diameter of at least twice the diameter of the receptacle 26 and the space occupied by the heating coil 34. However, because of the relatively large size of the tray 22 and its good heat conductivity, and the even transmittal of heat to the center of the tray due to the fact that there is a heat receptacle 26, the unusual and unexpected result attained is that heat is suitably distributed to a pizza or like foodstuff having its crust at the edges and main ingredients which should be retained in the best heated state as centrally located. Thus, while the heat is distributed in a substantially even manner, there is little likelihood of anyone being burned because of grasping the crust to take a pie-shaped piece of pizza off the tray, yet an adequate amount of heat is provided to maintain the whole pizza in a substantially evenly distributed warmed state.

Secured to the disc 22 is a suitable combination handle and leg means 70, which is of a unique configuration, being a one-piece construction, and the combination handle and leg means is welded at only two points 72 and 74 to the flange 28 and thereby secured to the tray 22 or else it is directly welded to the tray. This combination handle and leg means is generally in the shape of a pair of W-shaped side pieces 76 and 78 which are drawn by connecting portions 80 and 82 over which handle rollers 84 and 86 are disposed. The lowermost portions as at 90 of the W-shaped members 76 and 78 form legs for supporting the entire assembly.

In FIG. 7 there is shown a modified form of the heating element which may be of oval, circular or horseshoe shape, as at 100. Brackets 102 are used to hold this heating coil 100 in position. The heating coil 100 may be suitably covered with an insulative material 106 and the brackets 102 may be riveted as at 108 or otherwise secured to the fiber board 110. Of course, the heating coil 100 is connected by suitable conductors 112 to an electric cord 114.

As can be seen in FIG. 9, heat is conducted directly outwardly from the tray 22 in the direction of arrows H toward the peripheral edge 24.

Referring now to the embodiment of the invention as shown in FIG. 10, it will be seen that in lieu of the handle arrangement 70, a two-piece handle arrangement on opposite sides of the tray 140 may be utilized. The tray is provided with a peripheral upturned edge 142. The combination handle and leg means 144 includes a pair of legs 146, 148 interconnected by a substantially horizontally-extending portion 150 provided with an enlarged opening 152 therethrough to form a fingerhole. Bolts 154 or like fasteners may be used to threadedly secure the combination handle and leg means 144 to hold them in position. These may be formed of any suitable plastic material, such as nylon, bakelite, or any one of the synthetic plastic threads or like material.

In lieu of the handle arrangement, as shown in FIGS. 1, 10 and 11, in FIG. 12 there is shown a modified arrangement in which there is directly welded to the tray 170 suitable combination handle and feet means 172 which are disposed on opposite sides of the tray. These are welded as at 174 to the tray and including substantially U-shaped handle portions which extend angularly upwardly and outwardly and which have pairs of depending feet 174 extending downwardly substantially vertically from the weld points 174. These feet may be encased in rubber or plastic boots 176 or the like and suitable handle rollers 178 may be disposed on the horizontally-extending portions 180 of the U-shaped handles 172.

If it is desired to permit for full washability of the foodstuffs from this device, a lining tray 182, formed of glass or suitable plastic material may be disposed on the tray 170 for receiving pizza or like foodstuff.

A latitude of modification, substitution and change is intended in the the foregoing disclosure, and in some instances some features of the invention will be employed without a corresponding use of other features. Accordingly, it is appropriate that the appended claims be construed broadly and in a manner consistent with the spirit and scope of the invention herein.

We claim:

1. A warming tray comprising a disc of metal having high heat conductivity characteristics, a receptacle disposed beneath said disc and secured thereto, said disc having a peripheral upturned edge, an insulating pad in said receptacle, electric heat coil means in said receptacle, insulation means between said coil and said disc, said heating coil means having an outer roving of asbestos bonded to said pad, said receptacle and said coil means being of less than half the diameter of said disc, and combination fastener means extending thru said peripheral upturned edge securing said handle and leg means to said disc, said handle and leg means including a pair of U shaped handles having downwardly turned foot portions welded to said disc.

2. A pizza warmer according to claim 1 wherein said receptacle is disposed beneath said disc and secured thereto, an insulating pad in said receptacle, electric heating coil means disposed in said receptacle parallel to said disc, a top insulating means overlying said coil means, said receptacle and said coil means uniformly spaced from said disc and being of less than half the diameter of said disc, and one piece combination handle and leg means welded in no more than two places to said disc.

3. A pizza warmer comprising a disc of metal having high heat conductivity characteristics, said disc having a relatively large diameter, a receptacle disposed centrally beneath said disc and secured thereto, a jute insulating pad in said container having electric heating coil means disposed thereon, said coil means having a roving of asbestos bonded to said board, a top insulating means overlying said coil means, said receptacle and said coil means being of less than half the diameter of said disc, an electric cord for connecting said coil means to a source of electric power, said receptacle having an opening therethrough, strain relief means disposed in said opening and being mounted on said electric cord, said cord extending through said opening, combination handle and leg means, said disc having an upturned peripheral edge, said combination handle and leg means including a pair of members of a synthetic plastic material, and fastener extending through said peripheral edge securing said combination handle and leg means to said disc.

References Cited
UNITED STATES PATENTS

| | | | |
|---|---|---|---|
| 929,095 | 7/1909 | Kuhn | 219—460 |
| 1,174,030 | 2/1916 | Hadaway | 219—460 |
| 1,220,781 | 3/1917 | Parkhurst | 219—454 |
| 1,485,153 | 2/1924 | Wolcott | 219—443 |

RICHARD M. WOOD, *Primary Examiner.*

L. H. BENDER, *Assistant Examiner.*